Inventor
ADASON M. MILLER
By
Gary, Parker, Juettner & Cullinan
Att'ys

May 7, 1968 A. M. MILLER 3,381,943
METHOD AND APPARATUS FOR MIXING LIQUID AND SOLID MATERIALS
Filed Jan. 17, 1967 2 Sheets-Sheet 2
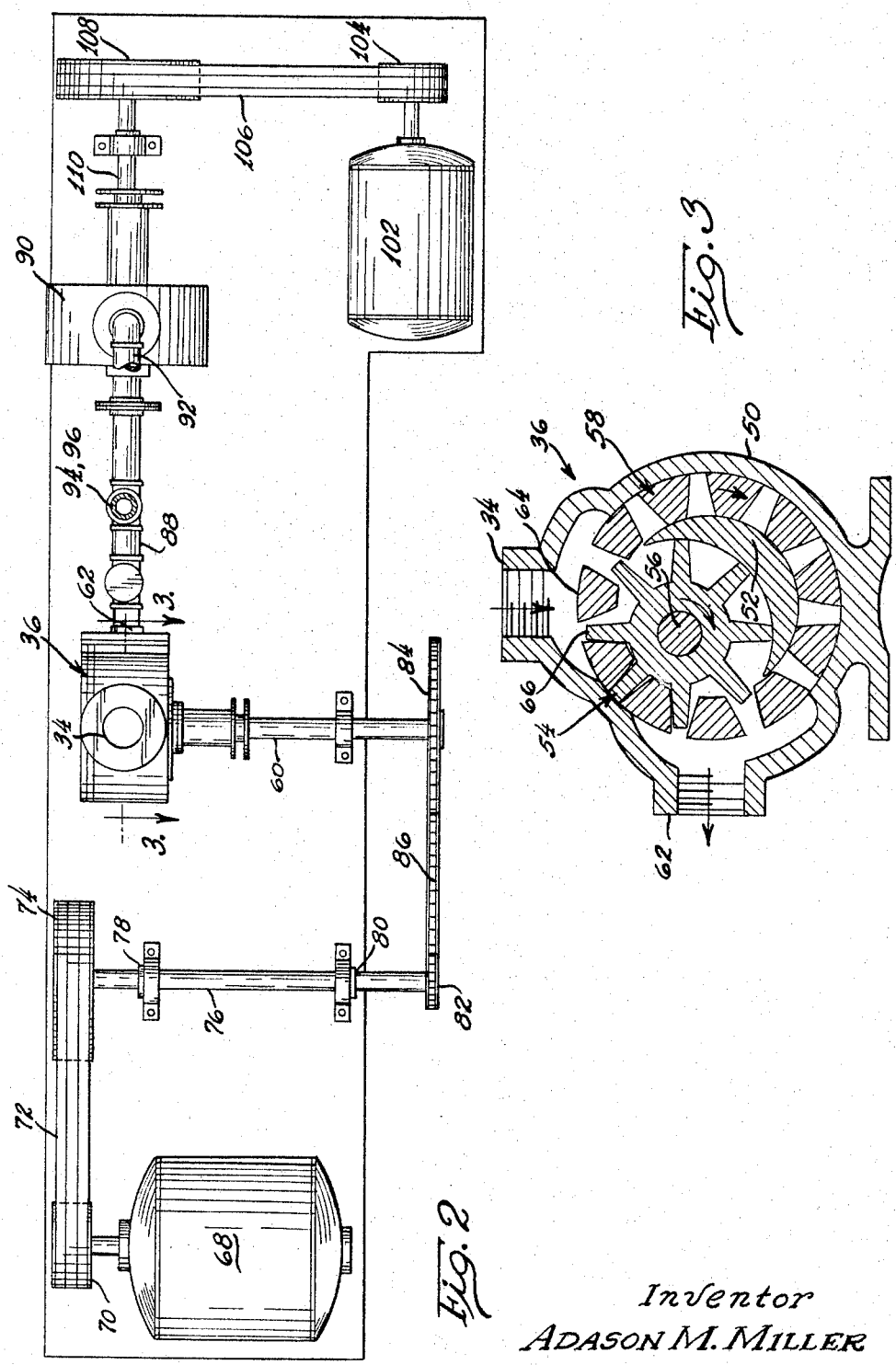
Inventor
ADASON M. MILLER
By Gary, Parker, Juettner & Cullinan
Att'ys

United States Patent Office 3,381,943
Patented May 7, 1968

3,381,943
METHOD AND APPARATUS FOR MIXING LIQUID AND SOLID MATERIALS
Adason M. Miller, La Grange, Ill. (% Trumbull Asphalt Company, 59th and Archer Road, Summit, Ill. 60501)
Filed Jan. 17, 1967, Ser. No. 609,812
11 Claims. (Cl. 259—148)

ABSTRACT OF THE DISCLOSURE

A method and apparatus for mixing liquid and solid materials, particularly liquid asphalt with one or more dry or solid materials, by first pre-soaking or wetting the dry material with asphalt supplied under pressure, and thereafter supplying the asphalt and other material wetted with asphalt to a positive displacement pump where the asphalt and other material are effectively mixed together.

*Brief summary of the invention*

Figure 1:
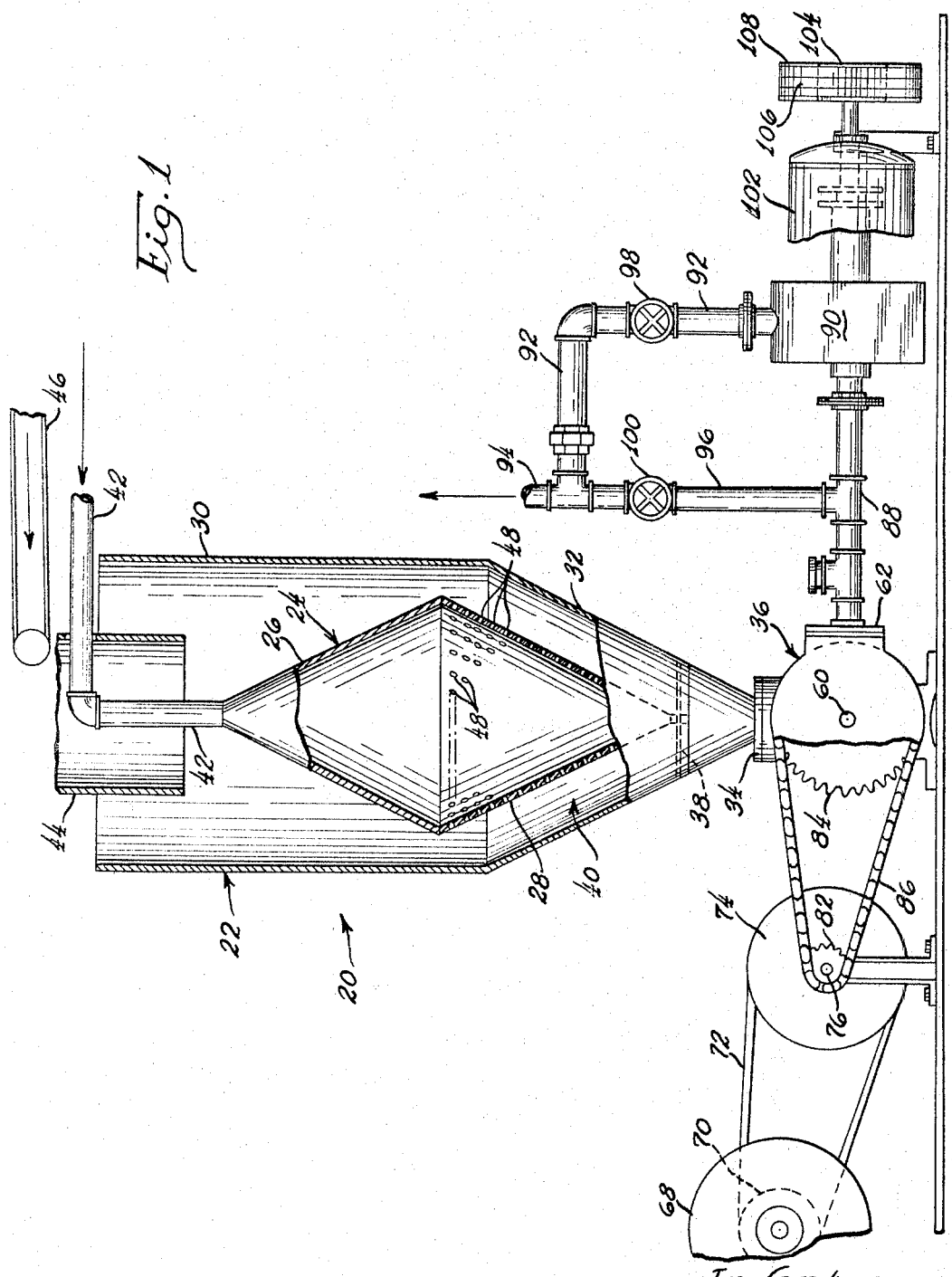

The present invention relates generally to the mixing of liquid and solid materials and is particularly adapted for mixing liquid asphalt with various dry materials to produce a final putty-like asphalt material which is useful as a roofing cement, as a roofing resurfacer, and for various other like applications, depending upon the particular dry materials selected for mixing with the liquid asphalt. By way of example, a highly useful roofing cement can be produced by mixing liquid asphalt with a combination of asbestos fibers and limestone dust. Heretofore, the most common method for mixing such materials has been to pump the liquid asphalt into a tank equipped with mixing paddle apparatus, after which the dry material such as a mixture of asbestos fibers and limestone dust is dropped into the tank. The paddles are then operated to churn the asbestos and limestone dust into the asphalt, the latter operation being a relatively slow batch-type process.

It is an object of the present invention to provide an improved method for mixing liquid asphalt or other liquid material with a selected dry material in a highly efficient continuous mixing operation.

Another object is to provide improved mixing apparatus for carrying out the method of the present invention.

A more specific object is to provide an improved method and apparatus whereby a liquid material such as liquid asphalt is supplied under pressure to wet or pre-soak dry material which is to be mixed therewith, after which the liquid asphalt and the pre-soaked material are conducted simultaneously to a positive displacement pump for mixing the pre-soaked material and liquid asphalt together in a continuous mixing operation.

The foregoing and other objects and advantages of the invention will be apparent rom the following description thereof.

Now, in order to acquaint those skilled in the art with the manner of making and using my invention, I will describe, in conjunction with the accompanying drawings, a preferred embodiment of the invention.

*The drawings*

FIGURE 1 is an elevational view, partly in vertical section, showing mixing apparatus constructed in accordance with the present invention;

FIGURE 2 is a top plan view of the apparatus of FIGURE 1 with the pre-soaking vessel which feeds into the pump being removed; and FIGURE 3 is an enlarged vertical sectional view, taken substantially along the line 3—3 of FIGURE 2, showing a positive displacement pump which in accordance with the present invention serves to continuously mix liquid and wetted materials supplied thereto from a pre-soaking vessel disposed above the pump.

*Detailed description of the invention*

Referring now to the drawings, there is shown a pre-soaking apparatus indicated generally at 20 in FIGURE 1 and including an outer housing 22 which is open to the atmosphere and an inner pressure vessel 24, the latter vessel comprising an upper conical member 26 and a lower conical member 28. The outer housing 22 includes an upper cylindrical housing portion 30 which is open to the atmosphere at its upper end, and a lower conical housing portion 32. The large upper end of the conical housing portion 32 is connected with the lower end of the cylindrical housing portion 30 to form a unitary outer housing, and the small lower end of the conical housing member 32 is supported at the inlet 34 of a positive displacement pump 36.

The large lower end of the upper conical pressure vessel 26 and the large upper end of the lower conical pressure vessel 28 are joined together to form the unitary pressure vessel 24, and the small lower end of the member 28 is supported on a bracket 38 adjacent the lower end of the conical outer housing member 32, the vessel 28 being approximately concentric relative to the outer housing member 32 so as to define an annular passageway 40 therebetween. The small upper end of the conical pressure vessel 26 is connected with a supply pipe 42 which supplies liquid asphalt under pressure to the pre-soaking apparatus 20. A relatively large diameter vertical feed tube 44 is disposed at the upper end of the cylindrical housing 30, and in the embodiment shown the tube 44 encompasses the supply pipe 42 and is positioned above the upper conical vessel 26 so that dry material supplied through the tube 44 will fall downwardly and engage against the inclined wall of the vessel 26. In order to deliver dry material to the feed tube 44 there is provided a delivery tube 46 which may if desired have a feed screw or auger (not shown) disposed therein for feeding dry material to the end of the tube 46 and down into the feed tube 44.

The liquid material such as liquid asphalt is supplied under pressure, e.g. up to about 40 p.s.i., and at a temperature in the approximate range of 100 to 130° F. The liquid asphalt is delivered through the supply pipe 42 and fills the upper and lower conical vessels 26 and 28. The lower conical vessel 28 is provided with a plurality of small holes 48, e.g. approximately 1/8-inch diameter, and thus the liquid asphalt under pressure is sprayed out of the conical vessel 28 and into the annular passage 40 between the vessel 28 and the outer housing member 32 so as to impinge and flow down the inner wall of the latter. Simultaneously therewith, the dry material which is to be mixed with the asphalt is delivered from the delivery tube 46 into the supply pipe 44 and falls from the latter down onto the inclined wall of the upper conical pressure vessel 26.

The dry material will thus fall downwardly into the annular passageway 40 and pass through the spray of liquid asphalt so as to be pre-soaked or wetted by the asphalt and carried downwardly by the latter. For purposes of the present example, the dry material will be assumed to be a mixture of asbestos fibers and limestone dust, in which case such mixture will be pre-soaked with asphalt and caused to bulk. The pre-soaked or wetted asbestos and limestone dust, together with any additional asphalt not absorbed by the asbestos and limestone dust, will pass downwardly through the inlet 34 into the pump 36 where such materials are thoroughly mixed, as will be described more fully hereinafter.

The pump 36 as best shown in FIGURE 3 is a conventional positive displacement rotary type pump comprising an outer casing 50, a fixed crescent-shaped member 52, an idler gear 54 which is rotatable on a pin 56, and a rotor gear 58 which is connected to a pump shaft 60 (see FIGURE 2) so as to be driven thereby. A pump of the type shown in FIGURE 3 will operate in either direction, and in the present embodiment the pump inlet is shown at 34 and the outlet at 62. Thus, the rotor gear 58 is driven in a clockwise direction, and the rotor teeth 64 mesh with the idler teeth 66 so that the idler gear 54 is also driven in a clockwise direction.

As the liquid asphalt and pre-soaked or wetted mixture of asbestos fibers and limestone dust reach the pump inlet 34 they are drawn into the pump and fill the spaces between the rotor teeth 64 and idler teeth 66. The material flow is divided at the stationary crescent 52 so that a portion of the material is disposed intermediate the rotor teeth 64 between the casing 50 and the outside surface of the crescent 52, and the remaining material moves between the idler teeth 66 along the inside surface of the crescent. The material thus flows in a generally rotary path, and as the rotor teeth 64 fill the spaces between the idler teeth 66, and vice versa, the material is forced out of the pump outlet 62, and I have found that as the material leaves the pump outlet the liquid asphalt and the asbestos fibers and limestone dust are substantially completely mixed with one another. A pump of the type described herein is generally known in the art as a "Viking" rotary pump, although it will be understood that various other positive displacement type pumps may be utilized in accordance with the present invention.

A pump drive motor 68 is provided with a motor pulley 70 which acts through a V-belt 72 to drive a large diameter pulley 74. The large pulley 74 is mounted on one end of a shaft 76 which is journaled in bearings 78 and 80, and a substantially smaller diameter sprocket 82 is mounted on the opposite end of the shaft 76. The pump drive shaft 60 is provided with a large diameter sprocket 84, and an endless drive chain 86 is trained over the sprockets 82 and 84 in order to drive the pump shaft 60 and thereby drive the pump rotor gear 58. It will be understood that the pulley 74 and sprocket 82 are interposed between the motor pulley 70 and pump drive sprocket 84 in order to function as a speed reducer.

When the mixture of liquid asphalt, asbestos and limestone dust is discharged from the pump outlet 62 it passes through a pipe 88 to a conventional homogenizer 90, and it then flows through a pipe 92 to an outlet pipe 94 which delivers the asphalt mixture to suitable shipping containers. A by-pass pipe 96 interconnects the pipe 88 with the outlet pipe 94, and the pipe 92 is provided with a valve 98 while the by-pass pipe 96 is provided with a valve 100. It will thus be understood that, if desired, the valve 98 may be closed and the valve 100 opened, in which case the asphalt mixture will by-pass the homogenizer 90. It will be seen that a motor 102 drives the homogenizer 90. through a motor pulley 104, a V-belt 106, and a large diameter pulley 108 mounted on the end of a homogenizer drive shaft 110.

It is an important feature of the present invention that the dry material, such as the asbestos fibers and limestone dust in the foregoing example, is wetted or presoaked with liquid asphalt, preferably by causing the dry material to pass through a spray of the asphalt, and thereafter the wetter asbestos and limestone dust and the liquid asphalt are conducted to a positive displacement pump for the final mixing operation. The wetting or pre-soaking of the dry material when it is passed through the spray of liquid asphalt causes the dry particles to bulk and greatly facilitates subsequent mixing of the materials, and the downward flow of liquid asphalt assists in conducting the asbestos and limestone dust down to the pump inlet 34. It is important to understand, however, that the mixing of the asphalt with the asbestos and limestone dust occurs primarily in the positive displacement pump 36, rather than in the pre-soaking apparatus 20. The liquid asphalt is supplied under pressure, normally in the approximate range of 20 to 40 p.s.i., and at a temperature normally in the approximate range of 100 to 130° F.

It should be understood that the method and apparatus of the present invention may be used to mix various liquid and dry materials. The present invention is particularly useful in mixing liquid asphalt with various dry materials, but the asbestos fibers and limestone dust described herein are merely given as examples of dry materials and the invention is in no way limited thereto. Certain specific examples of roofing products which may be made in accordance with the present invention are:

(1) *Asphalt plastic cement.*—Liquid asphalt is supplied at a temperature in the range of 100 to 130° F. and at a pressure in the range of 20 to 40 p.s.i., the asphalt being supplied at the rate of 15 gallons per minute; limestone dust is supplied at a rate of 30 lbs. per minute, and asbestos fibers is supplied at a rate of 40 lbs. per minute, the asbestos fibers and limestone dust being mixed before being supplied to the pre-soaking apparatus 20.

(2) *Resurfacer.*—Liquid asphalt is supplied at a temperature in the range of 100 to 130° F. and at a pressure in the range of 20 to 40 p.s.i., the asphalt being supplied at a rate of 45 gallons per minute; and asbestos fibers is supplied at a rate of 35 lbs. per minute.

It has been found that improved results can be obtained when the positive displacement pump 36 is operated at a capacity which substantially exceeds the amount of product supply being delivered thereto. That is, it is desirable that the pump be operated at a capacity equal to at least 125% of the total product supply, in which case the pump will create a downward air current in the pre-soaking apparatus 20 in the space between the outer housing portions 30 and 32 and the pressure vessel members 26 and 28. In this manner, a certain amount of air is entrained in the product being mixed, generally resulting in an improved final product. For example, good results can be obtained if the total product supply is approximately 40 gallons per minute and if the pump is operated at a capacity of 70 gallons per minute.

While I have described my invention in certain preferred forms, I do not intend to be limited to such forms, except insofar as the appended claims are so limited, since modifications coming within the scope of my invention will readily occur to those skilled in the art, particularly with my disclosure before them.

I claim:

1. Mixing apparatus for mixing together liquid and dry materials comprising, in combination, pre-soaking means for receiving a supply of liquid material and a supply of dry material and for applying the liquid material to the dry material in order to wet the latter, said pre-soaking means having first and second inlets for said liquid material and said dry material respectively and having a common outlet for said materials, said pre-soaking means comprising an inner pressure vessel for receiving a supply of liquid material under pressure and an outer housing which encompasses said pressure vessel and is open to the atmosphere, said pressure vessel and said outer housing defining a space therebetween for receiving said dry material, said pressure vessel having a plurality of small openings therein communicating with said space for spraying said liquid materials on said dry material as the latter passes through said space, and pump means having an inlet connected to said common outlet for receiving the liquid material and wetted dry material from said pre-soaking means and thoroughly mixing the same together and discharging the mixture at a pump outlet, said pre-soaking means and said pump means being continuously operable in order to provide a continuous mixing operation.

2. The invention of claim 1 where said pre-soaking means is positioned generally upright and where said common outlet is located at the lower end of said pre-soaking means whereby said spray of liquid material and said dry material will flow downwardly through said space at least in part due to gravity until they reach said common outlet and are drawn into said pump means.

3. Mixing apparatus for mixing together liquid and dry materials comprising, in combination, pre-soaking means for receiving a supply of liquid material and a supply of dry material and for applying the liquid material to the dry material in order to wet the latter, said pre-soaking means having first and second inlets for said liquid material and said dry material respectively, and having a common outlet for said materials, said pre-soaking means comprising an inner pressure vessel connected to said first inlet for receiving a supply of liquid material under pressure, and an outer housing which encompasses said pressure vessel and is open to the atmosphere, said pressure vessel and said outer housing defining a space therebetween which is in communication with said second inlet for receiving said dry material, said pressure vessel having a plurality of small openings therein communicating with said space for spraying said liquid material on said dry material so as to wet the latter as it passes through said space, said pre-soaking means being positioned generally upright and said common outlet being located at the lower end of said pre-soaking means whereby said spray of liquid material and said dry material will flow downwardly through said space at least in part due to gravity until they reach said common outlet, and a positive displacement rotary type pump having an inlet connected to said common outlet for receiving the liquid material and wetted dry material from said pre-soaking means and thoroughly mixing the same together and discharging the mixture at a pump outlet, said pre-soaking means and said pump being continuously operable in order to provide a continuous mixing operation.

4. The invention of claim 3 where said pressure vessel comprises a conical-shaped member oriented generally vertically with its large end disposed upwardly and having a plurality of small openings therein for emitting a spray of said liquid material, and where said outer housing includes a conical-shaped housing portion which encompasses said pressure vessel and is approximately concentric relative thereto.

5. The invention of claim 3 wherein said pressure vessel comprises a pair of oppositely disposed conical-shaped members positioned one above the other and connected at their large diameter ends to provide a unitary pressure vessel structure, the upper small diameter end of the upper conical-shaped member being connected with said first inlet for receiving a supply of liquid material under pressure, and the lower one of said conical-shaped members having a plurality of small openings therein for emitting a spray of said liquid materials, and where said outer housing includes a generally conical-shaped housing portion which encompasses said lower one of said conical-shaped pressure vessel members and is approximately concentric relative thereto.

6. The invention of claim 5 where said second inlet means is disposed above the upper one of said conical-shaped pressure vessel members so that dry material delivered through said second inlet means will impinge against the outer surface of said upper conical-shaped pressure vessel member and fall down into the space between the lower one of said conical-shaped pressure vessel members and said conical-shaped housing portion.

7. A continuous process for mixing liquid asphalt with a selected dry material comprising the steps of forming the liquid asphalt into a spray, passing the dry material through said spray in order to wet the same, and then conducting the wetted material together with the liquid asphalt to a pump in order to thoroughly mix said liquid asphalt and dry material, said pump being operated continuously in order to provide a continuous mixing operation.

8. The process of claim 7 where said liquid asphalt is supplied at a temperature in the approximate range of 100 to 130 degrees F. and at a pressure in the approximate range of 20 to 40 p.s.i.

9. The process of claim 7 wherein said pump is operated at a capacity equal to at least approximately 125% of the total product supply so as to cause air to be entrained in the final mixture.

10. The process of claim 7 where said dry material comprises asbestos fibers.

11. The process of claim 7 for mixing liquid asphalt with asbestos fibers, the liquid asphalt being supplied at a temperature in the approximate range of 100 to 130 degrees F. and at a pressure in the approximate range of 20 to 40 p.s.i., and the pump being operated at a capacity equal to at least approximately 125% of the total product supply so as to cause air to be entrained in the final mixture.

References Cited

UNITED STATES PATENTS

| 1,987,243 | 1/1935 | Madsen | 259—148 |
| 2,152,798 | 4/1939 | Fuller | 259—146 |
| 2,733,053 | 1/1956 | Dugas | 259—95 X |
| 3,212,759 | 10/1965 | Brown | 259—151 |

ROBERT W. JENKINS, *Primary Examiner.*